(12) United States Patent
Chen et al.

(10) Patent No.: US 7,404,072 B2
(45) Date of Patent: Jul. 22, 2008

(54) SYSTEM AND METHOD FOR LOADING A VALID IMAGE FROM ONE OF A PLURALITY OF IMAGES INTO A MEMORY OF A NETWORK DEVICE

(75) Inventors: Jian-An Chen, Tu-Cheng (TW); Chih-Yuan Huang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 391 days.

(21) Appl. No.: 11/081,472

(22) Filed: Mar. 16, 2005

(65) Prior Publication Data
US 2005/0268085 A1    Dec. 1, 2005

(30) Foreign Application Priority Data
Mar. 27, 2004    (CN) .......................... 2004 1 0026713

(51) Int. Cl.
G06F 9/00    (2006.01)
G06F 9/24    (2006.01)
G06F 11/00   (2006.01)
G06F 15/177  (2006.01)

(52) U.S. Cl. .............................. 713/1; 713/2; 713/100; 714/36; 714/100

(58) Field of Classification Search .............. 713/1, 713/2, 100; 714/36, 100
See application file for complete search history.

(56) References Cited

U.S. PATENT DOCUMENTS

| | | | |
|---|---|---|---|
| 5,475,839 A * | 12/1995 | Watson et al. ................. 713/2 |
| 6,425,079 B1 | 7/2002 | Mahmoud | |
| 6,732,267 B1 * | 5/2004 | Wu et al. ..................... 713/100 |
| 7,089,414 B2 * | 8/2006 | Langford et al. ............... 713/2 |
| 7,206,970 B1 * | 4/2007 | Lauterbach et al. ........... 714/36 |
| 2002/0147941 A1 * | 10/2002 | Gentile ....................... 714/36 |
| 2005/0081118 A1 * | 4/2005 | Cheston et al. ............... 714/47 |
| 2005/0149924 A1 * | 7/2005 | Komarla et al. ............. 717/176 |
| 2006/0129797 A1 * | 6/2006 | Durfee et al. .................. 713/2 |
| 2006/0136703 A1 * | 6/2006 | Wisecup et al. ................ 713/2 |

OTHER PUBLICATIONS

BIOS, PC Pages, Feb. 2, 2003.*

* cited by examiner

*Primary Examiner*—Mark Connolly
(74) *Attorney, Agent, or Firm*—Morris Manning Martin LLP; Tim Tingkang Xia, Esq.

(57) ABSTRACT

A system for loading images includes a read-only memory (ROM) (160) for storing the images; an initialization module (110) for initializing a running environment of the system, and for starting up a procedure for automatically loading the images; an image-searching module (130) for searching the images in the ROM; an image-validating module (140) for validating the images that are found by the image-searching module; an image-loading module (150) for loading valid images to a memory of a network device. A related method for loading images is also provided.

6 Claims, 2 Drawing Sheets

SYSTEM AND METHOD FOR LOADING A VALID IMAGE FROM ONE OF A PLURALITY OF IMAGES INTO A MEMORY OF A NETWORK DEVICE

BACKGROUND OF THE INVENTION

1. Field of the Invention

The present invention is related to systems and methods for loading images from a memory of a computer.

2. Prior Art

Nowadays, with the development of digital communication technologies and network technologies, embedded systems are applied in a wide variety of electronic devices. Generally, an embedded system is started up solely by a loader completely. The loader is an application for loading images from a read-only memory (ROM) to a memory of the embedded system before a kernel of an operating system (OS) starts up. In addition, the loader is used for building the images of a memory and for adjusting a running environment of the embedded system.

Most conventional loaders load images through two stages. The first stage of loading images is implemented by an application that is programmed by an assemble language. The loader initializes hardware devices and reads space of a memory of the embedded system. The second stage of loading images is implemented by an application that is programmed by a C language. The conventional loader re-initializes the hardware devices, checks a memory map, and reads images from the ROM to the memory of the embedded system. Overall, the running of the conventional loader is complex.

Consequently, a system and method to optimize the running of a loader are desired.

SUMMARY OF THE INVENTION

A primary objective of the present invention is to provide a system for readily loading images to a memory of a network device.

A secondary objective of the present invention is to provide a method for readily loading images to a memory of a network device.

In order to fulfill the above-mentioned primary objective, a preferred embodiment of the present invention provides a system for loading images. A preferred embodiment of the system comprises: a read-only memory (ROM) for storing the images; an initialization module for initializing a running environment of the system, and for starting up a procedure for automatically loading any of the images; an image-searching module for searching the images in the ROM; an image-validating module for validating images that are found by the image-searching module; and an image-loading module for loading valid images to a memory of a network device.

In order to accomplish the above-mentioned secondary objective, a preferred method for loading images of the present invention comprises the steps of: (a) initializing a running environment of a system; (b) switching a read-only memory (ROM) of the system to an engineering mode, if a mode switching module of the system detects an interrupt instruction; (c) searching an auto-booting image in the ROM by invoking an image-searching module of the system, and sending the auto-booting image to an image-validating module; (d) validating the auto-booting image searched by the image-searching module; and (e) loading the auto-booting image to a memory of a network device if the auto-booting image is valid.

Other objectives, advantages and novel features of the present invention will become more apparent from the following detailed description when taken in conjunction with the accompanying drawings, in which:

DETAILED DESCRIPTION OF THE INVENTION

Figure 1:
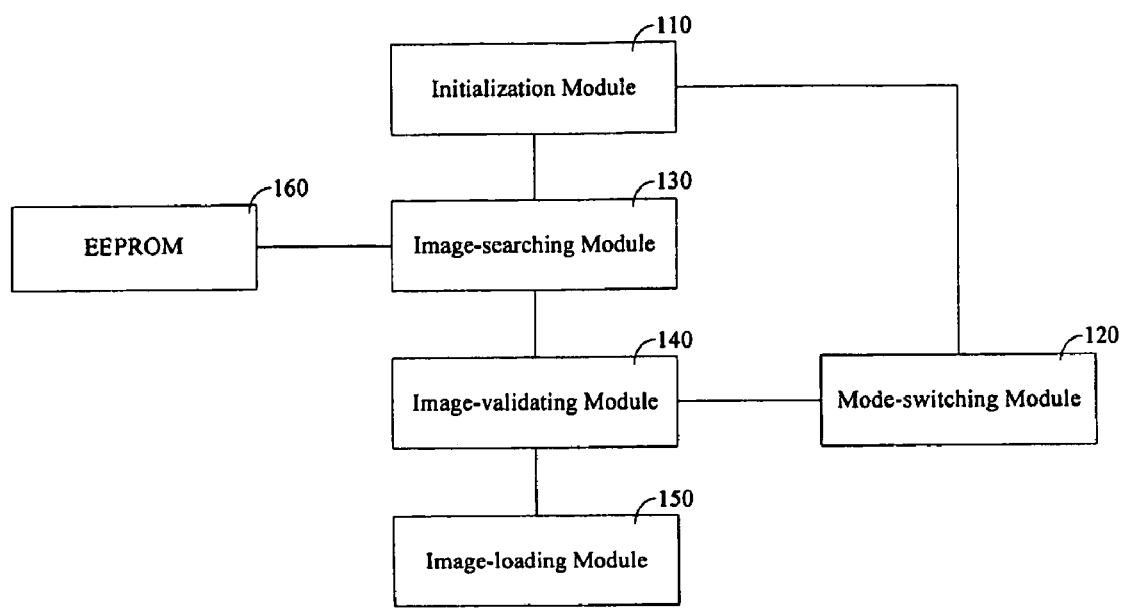
FIG. 1 is a block diagram of a system for loading images in accordance with the preferred embodiment of the present invention.

FIG. 1 is a block diagram of a system for loading images (hereinafter, "the system") of a computer system in accordance with the preferred embodiment of the present invention. The system comprises an initialization module 110, a mode-switching module 120, an image-searching module 130, an image-validating module 140, an image-loading module 150, and an electrically erasable programmable read-only memory (EEPROM) 160.

The EEPROM 160 stores an auto-booting image, a diagnosing image, and a running image. The auto-booting image is used for starting up an operating system (OS) of a network device. The diagnosing image is used for testing and diagnosing an application specific integrated circuit (ASIC) chip of the network device. The running image is provided for implementing finctions of the network device.

The initialization module 110 is used for initializing a running environment of the system and for starting up an auto-booting procedure. The auto-booting procedure is used for leading the system to load images automatically.

The mode-switching module 120 is used for detecting an interrupt instruction and for providing an engineering mode for the system. After the initialization module 110 is implemented, the mode-switching module 120 switches to the engineering mode and interrupts the auto-booting procedure if the mode-switching module 120 detects an interrupt instruction. Under the engineering mode, a user inputs corresponding commands to maintain the EEPROM 160 via a command line interface (CLI) provided by the mode-switching module 120. In addition, the mode-switching module 120 downloads specific images for implementing specific functions defined by the user when the images stored in the EEPROM 160 are invalid.

The image-searching module 130 is used for searching the images in the EEPROM 160. If the search of any of the images is unsuccessful, the image-searching module 130 repeats the search for that image until the image is successfully found.

The image-validating module 140 is used for validating the images searched by the image-searching module 130. If any of the images are valid, the image-validating module 140 sends the valid image to the image-loading module 150. If any one of the images is invalid, the image-validating module 140 sends invalidity information to the image-searching module 130, so that the image-searching module 130 searches other images.

Firstly, the image-searching module 130 searches the auto-booting image in the EEPROM 160, and sends the auto-booting image to the image-validating module 140. The image-validating module 140 verifies the auto-booting image. If the auto-booting image is invalid, the image-validating module 140 sends invalidity information to the image-searching module 130. The image-searching module 130 searches the diagnosing image in the EEPROM 160. Then, the diagnosing image is sent to the image-validating module 140 to be verified. If the diagnosing image is invalid, the image-validating module 140 sends invalidity information to the image-searching module 130. The image-searching module 130 goes on to search the running image in the EEPROM 160.

If the running image is invalid, the auto-booting procedure is interrupted, and the mode-switching module 120 switches the system to the engineering mode. In the engineering mode, a specific image for implementing specific functions defined by the user is downloaded. After the specific image is downloaded, the mode-switching module 120 sends the specific image to the image-validating module 140 for verification.

The image-loading module 150 is used for loading the valid image to the memory of the network device, in order to accomplish the corresponding function.

Figure 2:
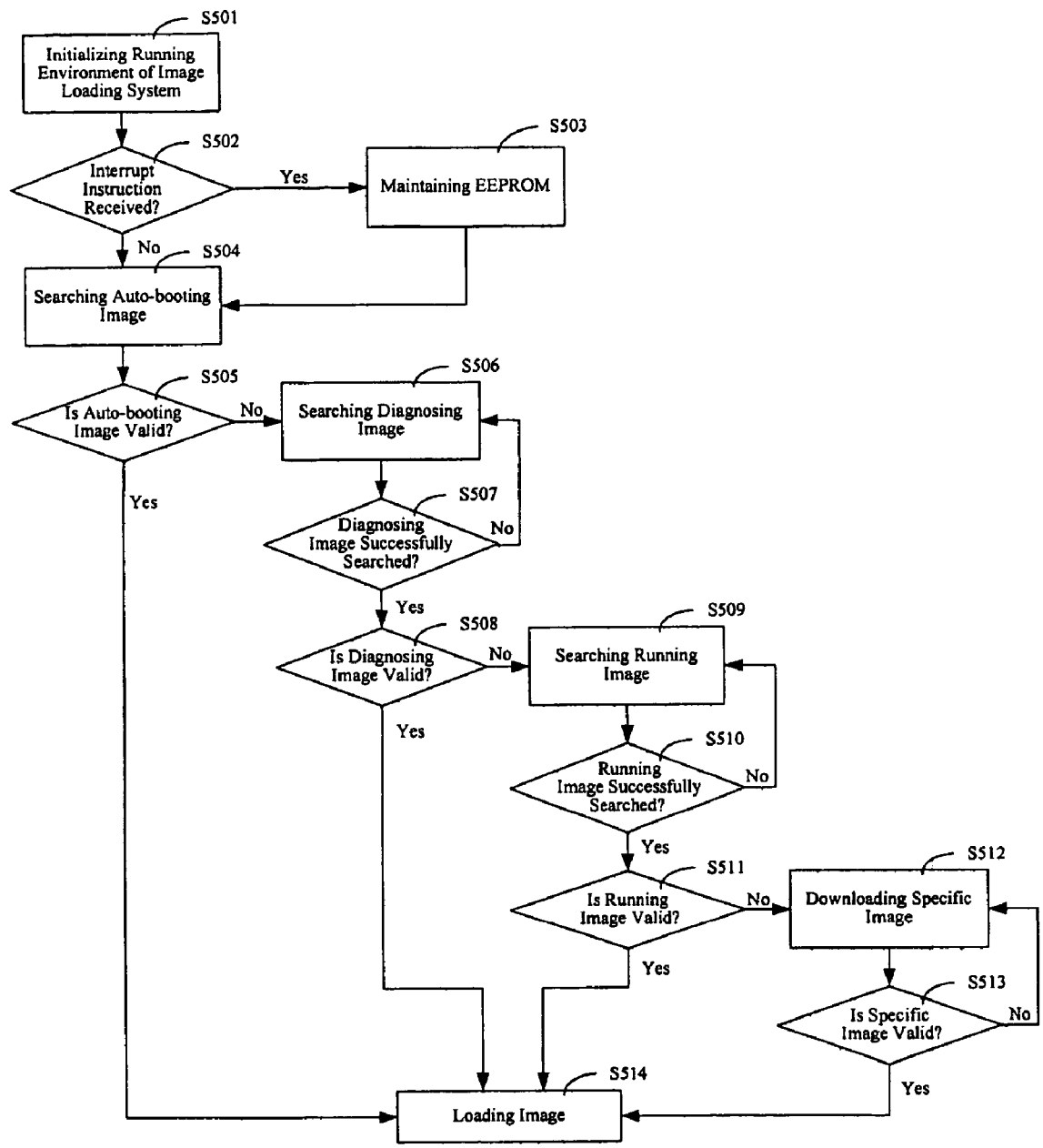
FIG. 2 is a flow chart of the preferred method for loading images in accordance with the present invention.

FIG. 2 is a flow chart of a method for loading images in accordance with the preferred embodiment of the present invention. At step S501, the initialization module 110 initializes the running environment of the system and starts up the auto-booting procedure.

At step S502, the mode-switching module 120 detects whether a user sends an interrupt instruction. If the mode-switching module 120 does not detect any interrupt instruction, the auto-booting procedure goes directly to the step S504 described below. Otherwise, at step S503, the mode-switching module 120 switches to the engineering mode, and the user maintains the EEPROM 160 under the engineering mode. After the user finishes the maintenance of the EEPROM 160, the mode-switching module 120 restarts up the auto-booting procedure, which goes to step S504 described below.

At step S504, the image-searching module 130 searches the auto-booting image in the EEPROM 160 based on the auto-booting procedure and sends the auto-booting image to the image-validating module 140.

At step S505, the image-validating module 140 verifies the auto-booting image. If the auto-booting image is valid, the auto-booting image is sent to the image-loading module 150, and the procedure goes directly to step S514 described below. Otherwise, at step S506, the image-searching module 130 receives invalidity information. The image-searching module 130 searches the diagnosing image in the EEPROM 160 based on the invalidity information.

At step S507, the image-searching module 130 determines whether the diagnosing image is searched successfully. If the diagnosing image is not searched successfully, the procedure goes back to step S506 described above for the image-searching module 130 to re-search the diagnosing image in the EEPROM 160. If and when the diagnosing image is searched successfully, the image-searching module 130 sends the diagnosing image to the image-validating module 140, and the procedure goes to step S508 described below.

At step S508, the image-validating module 140 verifies the diagnosing image. If the diagnosing image is valid, the diagnosing image is sent to the image-loading module 150, and the procedure goes directly to step S514 described below. If the diagnosing image is invalid, at step S509, the image-searching module 130 searches the running image in the EEPROM 160 based on invalidity information.

At step S510, the image-searching module 130 determines whether the running image is searched successfully. If the running image is not searched successfully, the procedure goes back to step S509 described above for the image-searching module 130 to re-search the running image in the EEPROM 160. If and when the running image is searched successfully, the image-searching module 130 sends the running image to the image-validating module 140, and the procedure goes back to step S511 described below.

At step S511, the image-validating module 140 verifies the running image. If the running image is valid, the running image is sent to the image-loading module 150, and the procedure goes directly to step S514 described below. Otherwise, at step S512, the mode-switching module 120 switches to the engineering mode, and the user downloads the specific image by inputting commands to the CLI in the engineering mode. Then, the mode-switching module 120 restarts up the auto-booting procedure, which goes to step S513 described below.

At step S513, the image-validating module 140 verifies the specific image. If the specific image is invalid, the procedure goes back to step S512 described above. If and when the specific image is valid, the specific image is sent to the image-loading module 150, and the procedure goes directly to step S514 described blow.

At step S514, the image-loading module 150 loads the valid image to the memory of the network device.

Although only a preferred embodiment and method of the present invention have been described in detail above, those skilled in the art will readily appreciate that a plurality of modifications to the preferred embodiment and method are possible without materially departing from the novel teachings and advantages of the present invention. Accordingly, all such modifications are deemed to be covered by the following claims and allowable equivalents of the claims.

What is claimed is:

1. A system for loading images, comprising:
a read-only memory (ROM) for storing the images;
an initialization module for initializing a running environment of the system, and for starting up a procedure for automatically loading any of the images;
an image-searching module for searching the images in the ROM;
an image-validating module for validating images that are found by the image-searching module;
an image-loading module for loading valid images to a memory of a network device; and
a mode-switching module for switching the system to an engineering mode, in which the ROM can be maintained and a specific image defined by a user can be downloaded;
wherein the image-searching module searches an auto-booting image in the ROM, the image-validating module validates the auto-booting image, and the image-loading module loads the auto-booting image to the memory of the network device if the auto-booting image is valid, and if the auto-booting image is invalid, the image-searching module searches a diagnosing image in the ROM, the image-validating module validates the diagnosing image, and the image-loading module loads the diagnosing image to the memory of the network device if the diagnosing image is valid.

2. The system as recited in claim 1, wherein the mode-switching module switches to the engineering mode to maintain the ROM when the mode-switching module detects an interrupt instruction.

3. The system as recited in claim 1, wherein the mode-switching module switches to the engineering mode to download the specific image when the images stored in the ROM are invalid.

4. A computer-enabled method for loading images, comprising the steps of:
(a) initializing a running environment of a system;
(b) switching a read-only memory (ROM) of the system to an engineering mode, if a mode-switching module of the system detects an interrupt instruction;

(c) searching an auto-booting image in the ROM by invoking an image-searching module of the system, and sending the auto-booting image to an image-validating module;

(d) validating the auto-booting image searched by the image-searching module; and (e) loading the auto-booting image to a memory of a network device, if the auto-booting image is valid; and (f) if the auto-booting image is invalid:

(f1) searching a diagnosing image in the ROM by invoking the image-searching module;

(f2) sending the diagnosing image to the image-validating module;

(f3) validating the diagnosing image received from the image-searching module; and (f4) if the diagnosing image is invalid:

(f41) searching a running image in the ROM by invoking the image-searching module;

(f42) sending the running image to the image-validating module;

(f43) validating the running image received from the image-searching module; and (f44) loading the running image to the memory of the network device if the running image is valid; and (f5) loading the diagnosing image to the memory of the network device, if the diagnosing image is valid.

5. The method as recited in claim 4, further comprising the following step after step (f43): downloading a specific image defined by a user if the running image is invalid.

6. A computer-enabled method for loading images, comprising:

(a) initializing a running environment of a system;

(b) searching an auto-booting image in read-only memory (ROM) of the system by invoking an image-searching module of the system, and sending the auto-booting image to an image-validating module;

(c) validating by the image-validating module of the auto-booting image searched by the image-searching module; and (d) loading the auto-booting image to a memory of a network device, if the auto-booting image is valid; and (e) if the auto-booting image is invalid:

(e1) searching a diagnosing image in the ROM by invoking the image-searching module;

(e2) sending the diagnosing image to the image-validating module;

(e3) validating by the image-validating module of the diagnosing image received from the image-searching module; and (e4) if the diagnosing image is invalid:

(e41) searching a running image in the ROM by invoking the image-searching module;

(e42) sending the running image to the image-validating module;

(e43) validating the running image received from the image-searching module; and (e44) loading the running image to the memory of the network device if the running image is valid; and (e5) loading the diagnosing image to the memory of the network device, if the diagnosing image is valid.

* * * * *